United States Patent
Zhang et al.

(10) Patent No.: US 7,826,537 B2
(45) Date of Patent: Nov. 2, 2010

(54) SYSTEMS AND METHODS WITH ERROR RESILIENCE IN ENHANCEMENT LAYER BITSTREAM OF SCALABLE VIDEO CODING

(75) Inventors: Ya-Qin Zhang, West Windsor, NJ (US); Shipeng Li, Princeton, NJ (US); Feng Wu, Beijing (CN); Rong Yan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1769 days.

(21) Appl. No.: 10/977,773

(22) Filed: Oct. 29, 2004

(65) Prior Publication Data

US 2005/0069036 A1    Mar. 31, 2005

Related U.S. Application Data

(63) Continuation of application No. 09/785,829, filed on Feb. 16, 2001, now Pat. No. 6,816,194, which is a continuation of application No. 10/945,011, filed on Sep. 20, 2004.

(60) Provisional application No. 60/217,638, filed on Jul. 11, 2000.

(51) Int. Cl.
  *H04N 7/18*   (2006.01)
(52) U.S. Cl. ............................. 375/240.27; 375/240.28
(58) Field of Classification Search ..............................
  375/240.01–240.29
  See application file for complete search history.

(56) References Cited

U.S. PATENT DOCUMENTS

| | | | |
|---|---|---|---|
| 6,263,022 B1 | 7/2001 | Chen et al. | |
| 6,445,742 B1 | 9/2002 | Yoo et al. | |
| 6,498,865 B1 | 12/2002 | Brailean et al. | |
| 7,155,657 B2 * | 12/2006 | Bordes et al. | ................ 714/774 |

OTHER PUBLICATIONS

R. Talluri, "Error-Resilient Video Coding in the ISO MPEG-4 Standard," IEEE Communications Magazine, pp. 112-119, Jun. 1998.
Y. Wang, "Error Control and Concealment for Video Communication: A Review," Proceedings of the IEEE, vol. 86, No. 5, pp. 974-997, May 1998.
E. N. Gilbert, "Capacity of a Burst-Noise Channel," The Bell System Technical Journal, pp. 1253-1265, Sep. 1960.
M. Yajnik et al., "Measurement and Modelling of the Temporal Dependence in Packet Loss," UMASS CMPSCI Technical Report #98-78, pp. 1-22, 1999.

* cited by examiner

*Primary Examiner*—Andy S Rao
(74) *Attorney, Agent, or Firm*—Lee & Hayes, PLLC

(57) ABSTRACT

A scalable layered video coding scheme that encodes video data frames into multiple layers, including a base layer of comparatively low quality video and multiple enhancement layers of increasingly higher quality video, adds error resilience to the enhancement layer. Unique resynchronization marks are inserted into the enhancement layer bitstream in headers associated with each video packet, headers associated with each bit plane, and headers associated with each video-of-plane (VOP) segment. Following transmission of the enhancement layer bitstream, the decoder tries to detect errors in the packets. Upon detection, the decoder seeks forward in the bitstream for the next known resynchronization mark. Once this mark is found, the decoder is able to begin decoding the next video packet. With the addition of many resynchronization marks within each frame, the decoder can recover very quickly and with minimal data loss in the event of a packet loss or channel error in the received enhancement layer bitstream. The video coding scheme also facilitates redundant encoding of header information from the higher-level VOP header down into lower level bit plane headers and video packet headers. Header extension codes are added to the bit plane and video packet headers to identify whether the redundant data is included.

24 Claims, 8 Drawing Sheets

SYSTEMS AND METHODS WITH ERROR RESILIENCE IN ENHANCEMENT LAYER BITSTREAM OF SCALABLE VIDEO CODING

RELATED APPLICATIONS

This non-provisional utility application also claims priority to continuation application Ser. No. 10/945,011 filed Sep. 20, 2004, by the same inventors and commonly assigned with this application. This non-provisional utility application also claims priority to continuation application Ser. No. 09/785,829 filed Feb. 16, 2001, by the same inventors and commonly assigned with this application, now U.S. Pat. No. 6,816,194. Application Ser. No. 09/785,829 itself claimed priority to provisional application No. 60/217,638 entitled "Error Resilience Methods in Enhancement Layer Bitstream of Scalable Video Coding", filed on Jul. 11, 2000 by Rong Yan, Feng Wu, Shipeng Li, and Ya-Qin Zhang, and commonly assigned to the assignee of the present invention.

TECHNICAL FIELD

This invention relates to systems and methods for coding video data, and more particularly, to motion-compensation-based video coding schemes that employ error resilience techniques in the enhancement layer bitstream.

BACKGROUND

Efficient and reliable delivery of video data is increasingly important as the Internet and wireless channel networks continue to grow in popularity. Video is very appealing because it offers a much richer user experience than static images and text. It is more interesting, for example, to watch a video clip of a winning touchdown or a Presidential speech than it is to read about the event in stark print. Unfortunately, video data is significantly larger than other data types commonly delivered over the Internet. As an example, one second of uncompressed video data may consume one or more Megabytes of data.

Delivering such large amounts of data over error-prone networks, such as the Internet and wireless networks, presents difficult challenges in terms of both efficiency and reliability. These challenges arise as a result of inherent causes such as bandwidth fluctuations, packet losses, and channel errors. For most Internet applications, packet loss is a key factor that affects the decoded visual quality. For wireless applications, wireless channels are typically noisy and suffer from a number of channel degradations, such as random errors and burst errors, due to fading and multiple path reflections. Although the Internet and wireless channels have different properties of degradations, the harms are the same to the video bitstream. One or multiple video packet losses may cause some consecutive macroblocks and frames to be undecodable.

To promote efficient delivery, video data is typically encoded prior to delivery to reduce the amount of data actually being transferred over the network. Image quality is lost as a result of the compression, but such loss is generally tolerated as necessary to achieve acceptable transfer speeds. In some cases, the loss of quality may not even be detectable to the viewer.

Video compression is well known. One common type of video compression is a motion-compensation-based video coding scheme, which is used in such coding standards as MPEG-1, MPEG-2, MPEG-4, H.261, and H.263.

One particular type of motion-compensation-based video coding scheme is a layer-based coding schemed, such as fine-granularity layered coding. Layered coding is a family of signal representation techniques in which the source information is partitioned into sets called "layers". The layers are organized so that the lowest, or "base layer", contains the minimum information for intelligibility. The other layers, called "enhancement layers", contain additional information that incrementally improves the overall quality of the video. With layered coding, lower layers of video data are often used to predict one or more higher layers of video data.

The quality at which digital video data can be served over a network varies widely depending upon many factors, including the coding process and transmission bandwidth. "Quality of Service", or simply "QoS", is the moniker used to generally describe the various quality levels at which video can be delivered. Layered video coding schemes offer a wide range of QoSs that enable applications to adapt to different video qualities. For example, applications designed to handle video data sent over the Internet (e.g., multi-party video conferencing) must adapt quickly to continuously changing data rates inherent in routing data over many heterogeneous subnetworks that form the Internet. The QoS of video at each receiver must be dynamically adapted to whatever the current available bandwidth happens to be. Layered video coding is an efficient approach to this problem because it encodes a single representation of the video source to several layers that can be decoded and presented at a range of quality levels.

Apart from coding efficiency, another concern for layered coding techniques is reliability. In layered coding schemes, a hierarchical dependence exists for each of the layers. A higher layer can typically be decoded only when all of the data for lower layers or the same layer in the previous prediction frame is present. If information at a layer is missing, any data for the same or higher layers is useless. In network applications, this dependency makes the layered encoding schemes very intolerant of packet loss, especially at the lower layers. If the loss rate is high in layered streams, the video quality at the receiver is very poor.

FIG. 1 depicts a conventional layered coding scheme 100, known as "fine-granularity scalable" or "FGS". Three frames are shown, including a first or intraframe 102 followed by two predicted frames 104 and 106 that are predicted from the intraframe 102. The frames are encoded into four layers: a base layer 108, a first layer 110, a second layer 112, and a third layer 114. The base layer 108 typically contains the video data that, when played, is minimally acceptable to a viewer. Each additional layer 110-114, also known as "enhancement layers", contains incrementally more components of the video data to enhance the base 11 layer. The quality of video thereby improves with each additional enhancement layer. This technique is described in more detail in an article by Weiping Li, entitled "Fine Granularity Scalability Using Bit-Plane Coding of DCT Coefficients", ISO/IEC JTC1/SC29/WG11, MPEG98/M4204 (December 1998).

One characteristic of the FGS coding scheme illustrated in FIG. 1 is that the enhancement layers 110-114 in the predicted frames can be predictively coded from the base layer 108 in a preceding reference frame. In this example, the enhancement layers of predicted frame 104 can be predicted from the base layer of intraframe 102. Similarly, the enhancement layers of predicted frame 106 can be predicted from the base layer of preceding predicted frame 104.

With layered coding, the various layers can be sent over the network as separate sub-streams, where the quality level of the video increases as each sub-stream is received and decoded. The base layer 108 is sent as one bitstream and one or more enhancement layers 110-114 are sent as one or more other bitstreams.

FIG. 2 illustrates the two bitstreams: a base layer bitstream 200 containing the base layer 108 and an enhancement layer bitstream 202 containing the enhancement layers 110-114. Generally, the base layer is very sensitive to any packet losses and errors and hence, any errors in the base bitstream 200 may cause a decoder to lose synchronization and propagate errors. Accordingly, the base layer bitstream 200 is transmitted in a well-controlled channel to minimize error or packet-loss. The base layer is encoded to fit in the minimum channel bandwidth and is typically protected using error protection techniques, such as FEC (Forward Error Correction) techniques. The goal is to deliver and decode at least the base layer 108 to provide minimal quality video.

Research has been done on how to integrate error protection and error recovery capabilities into the base layer syntax. For more information on such research, the reader is directed to R. Talluri, "Error-resilient video coding in the ISO MPEG-4 standard", IEEE communications Magazine, pp 112-119, June, 1998; and Y. Wang, Q. F. Zhu, "Error control and concealment for video communication: A review", Proceeding of the IEEE, vol. 86, no. 5, pp 974-997, May, 1998.

The enhancement layer bitstream 202 is delivered and decoded, as network conditions allow, to improve the video quality (e.g., display size, resolution, frame rate, etc.). In addition, a decoder can be configured to choose and decode a particular portion or subset of these layers to get a particular quality according to its preference and capability.

The enhancement layer bitstream 202 is normally very robust to packet losses and/or errors. The enhancement layers in the FGS coding scheme provide an example of such robustness. The bitstream is transmitted with frame marks 204 that demarcate each frame in the bitstream (FIG. 2). If a packet loss or error 206 occurs in the enhancement layer bitstream 202, the decoder simply drops the rest of the enhancement layer bitstream for that frame and searches for the next frame mark to start the next frame decoding. In this way, only one frame of enhancement data is lost. The base layer data for that frame is not lost since it resides in a separate bitstream 200 with its own error detection and correction. As a result, occasionally dropping portions of the enhancement layer bitstream 202 does not result in any annoying visual artifacts or error propagations.

Therefore, the enhancement layer bitstream 202 is not normally encoded with any error detection and error protection syntax. However, errors in the enhancement bitstream 202 cause a very dramatic decrease in bandwidth efficiency. This is because the rate of video data transfer is limited by channel error rate rather than by channel bandwidth. Although the channel bandwidth may be very broad, the actual data transmission rates are very small due to the fact that the rest of the stream is discarded whenever an error is detected in the enhancement layer bitstream.

Accordingly, there is a need for new methods and systems that improve the error resilience of the enhancement layer to thereby improve bandwidth efficiency. However, any such improvements should minimize any additional overhead in the enhancement bitstream.

Prior to describing such new solutions, however, it might be helpful to provide a more detailed discussion of one approach to model packet loss or errors that might occur in the enhancement layer bitstream. FIG. 3 shows a state diagram for a two-state Markov model 300 proposed in E. N. Gilbert, "Capacity of a Burst-Noise Channel", Bell System Technical Journal, 1960, which can be used to simulate both packet losses in an Internet channel and symbol errors in a wireless channel. This model characterizes the loss or error sequences generated by data transmission channels. Losses or errors occur with low probability in a good state (G), referenced as number 302, and occur with high probability in bad state (B), referenced as number 304. The losses or errors occur in cluster or bursts with relatively long error free intervals (gaps) between them. The state transitions are shown in FIG. 3 and summarized by its transition probability matrix P:

$$P = \begin{bmatrix} \alpha & 1-\alpha \\ 1-\beta & \beta \end{bmatrix}$$

This model can be used to generate the cluster and burst sequences of packet losses or symbol errors. In this case, it is common to set $\alpha \approx 1$ and $\beta = 0.5$. The random packet losses and symbol errors are a special case for the model 400. Here, the model parameters can be set $\alpha \approx 1$ and $\beta = 1$, where the error rate is $1-\alpha$.

The occupancy times in good state G are important to deliver the enhancement bitstream. So we define a Good Run Length (GRL) as the length of good symbols between adjacent error points. The distributions of the good run length are subject to a geometrical relationship given by M. Yajnik, "Measurement and Modeling of the Temporal Dependence in Packet Loss", UMASS CMPSCI Technical Report #98-78:

$$p(k) = (1-\alpha)\alpha^{k-1} \; k=1, 2, \ldots, \infty$$

Thus, the mean of GRL should be:

$$m = \lim_{N \to \infty} \sum_{k=1}^{N} k \times p(k)$$
$$= \lim_{N \to \infty} \frac{1 - \alpha^N}{1 - \alpha}$$

Since $\alpha$ is always less than 1, the above mean of GRL is close to $(1-\alpha)^{-1}$. In other words, the average length of continuous good symbols is $(1-\alpha)^{-1}$ when the enhancement bitstream is transmitted over this channel.

In a common FGS or PFGS enhancement bitstream, there are no additional error protection and error recovery capacities. Once there are packet losses and errors in the enhancement bitstream, the decoder simply drops the rest of the enhancement layer bitstream of that frame and searches for the next synchronized marker. Therefore, the correct decoded bitstream in every frame lies between the frame header and the location where the first error occurred. According to the simulation channel modeled above, although the channel bandwidth may be very broad, the average decoded length of enhancement bitstream is only $(1-\alpha)^{-1}$ symbols. Similarly, the mean of bad run length is close to $(1-\beta)^{-1}$. In other words, the occupancy times for good state and bad state are both geometrically distributed with respective mean $(1-\alpha)^{-1}$ and $(1-\beta)^{-1}$. Thus, the average symbol error rate produced by the two-state Markov model is:

$$er = \frac{1-\alpha}{1-\alpha+1-\beta}$$

To demonstrate what a value for $(1-\alpha)^{-1}$ in a typically wireless channel might be, suppose the average symbol error rate is 0.01 and its fading degree is 0.6. The corresponding parameter β of the two-state Markov model 400 is 0.6 (equal to the fading degree) and the parameter α is about 0.996, calculated using above formula. In such a wireless channel, the effective data transmitted (i.e., the good run length) is always about 250 symbols per frame. Generally, each symbol consists of 8 bits in the channel coding and transmission. Thus, the effective transmitted data per frame is around 2,000 bits (i.e., 250 symbols×8 bits/symbol). The number of transmitted bits per frame as predicted by channel bandwidth would be far larger than this number.

Our experimental results also demonstrate that the number of actual decoded bits per every frame is almost a constant (e.g., about 5000 bits) in various channel bandwidths (the number of bits determined by channel bandwidth is very large compared to this value). Why are the actual decoded bits at the decoder more than the 2,000 bits (the theoretical value)? The reason for this discrepancy is that there are no additional error detection/protection tools in enhancement bitstream is Only variable length table has a very weak capacity to detect errors. Generally, the location in the bitstream where the error is detected is not the same location where the error has actually occurred. Generally, the location where an error is detected is far from the location where the error actually occurred.

It is noted that the results similar to those of the above burst error channel can be achieved for packet losses and random errors channel. Analysis of random error channel is relatively simple in that the mean of GRL is the reciprocal of the channel error rate. The analysis of packet loss, however, is more complicated. Those who are interested in a packet loss analysis are directed to M. Yajnik, "Measurement and Modeling of the Temporal Dependence in Packet Loss", UMASS CMPSCI Technical Report #98-78. In short, when the enhancement bitstream is delivered through packet loss channel or wireless channel, the effective data transmitted rate is only determined by channel error conditions, but not by channel bandwidth.

SUMMARY

A video coding scheme employs a scalable layered coding, such as progressive fine-granularity scalable (PFGS) layered coding, to encode video data frames into multiple layers. The layers include a base layer of comparatively low quality video and multiple enhancement layers of increasingly higher quality video.

The video coding scheme adds error resilience to the enhancement layer to improve its robustness. In the described implementation, in addition to the existing start codes associated with headers of each video-of-plane (VOP) and each bit plane, more unique resynchronization marks are inserted into the enhancement layer bitstream, which partition the enhancement layer bitstream into more small video packets. With the addition of many resynchronization marks within each frame of video data, the decoder can recover very quickly and with minimal data loss in the event of a packet loss or channel error in the received enhancement layer bitstream.

As the decoder receives the enhancement layer bitstream, the decoder attempts to detect any errors in the packets. Upon detection of an error, the decoder seeks forward in the bitstream for the next known resynchronization mark. Once this mark is found, the decoder is able to begin decoding the next video packet.

The video coding scheme also facilitates redundant encoding of header information from the higher level VOP header down into lower level bit plane headers and video packet headers. Header extension codes are added to the bit plane and video packet headers to identify whether the redundant data is included. If present, the redundant data may be used to check the accuracy of the VOP header data or recover this data in the event the VOP header is not correctly received.

For delivery over the Internet or wireless channel, the enhancement layer bitstream is packed into multiple transport packets. Video packets at the same location, but belonging to different enhancement layers, are packed into the same transport packet. Every transport packet can comprise one or multiple video packets in the same enhancement layers subject to the enhancement bitstream length and the transport packet size. Additionally, video packets with large frame correlations are packed into the same transport packet.

BRIEF DESCRIPTION OF THE DRAWINGS

The same numbers are used throughout the drawings to reference like elements and features.

FIG. 2 illustrates the problem of packet loss or error in the enhancement layer bitstream.

DETAILED DESCRIPTION

This disclosure describes a layered video coding scheme used in motion-compensation-based multiple layer video coding systems and methods, such as FGS (Fine-Granularity Scalable) in the MPEG-4 standard. The proposed coding scheme can also be used in conjunction with the PFGS (Progressive FGS) system proposed in two previously filed US patent applications:

"System and Method for Robust Video Coding Using Progressive Fine-Granularity Scalable (PFGS) Coding," Ser. No. 09/454,489, filed Dec. 3, 1999 by inventors Feng Wu, Shipeng Li, and Ya-Qin Zhang; and "System and Method with Advance Predicted Bit-Plane Coding for Progressive Fine-Granularity Scalable (PFGS) Video Coding," Ser. No. 09/505,254, filed Feb. 15, 2000 by inventors Feng Wu, Shipeng Li, and Ya-Qin Zhang.

Both of these U.S. Patent Applications are incorporated by reference.

The techniques described below can be integrated into a variety of scalable coding schemes to improve enhancement layer robustness. The coding scheme is described in the context of delivering scalable bitstream over a network, such as the Internet or a wireless network. However, the layered video coding scheme has general applicability to a wide variety of environments. Furthermore, the techniques are described in the context of the PFGS coding scheme, although the techniques are also applicable to other motion-compensation-based multiple layer video coding technologies.

Exemplary System Architecture

Figure 4:
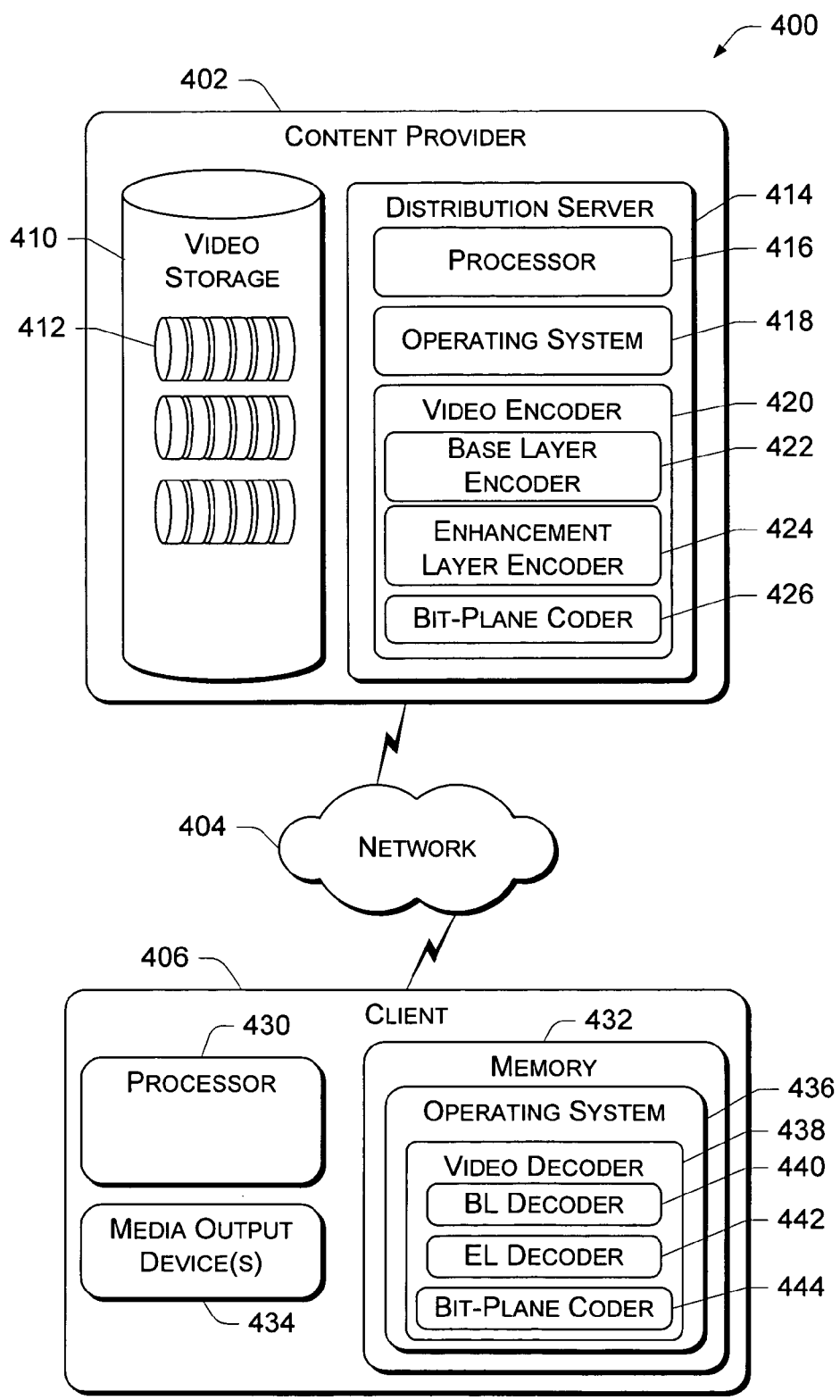
FIG. 4 is a block diagram of a video distribution system in which a content producer/provider encodes video data and transfers the encoded video data over a network to a client.

FIG. 4 shows a video distribution system 400 in which a content producer/provider 402 produces and/or distributes multimedia content over a network 404 to a client 406. The network is representative of many different types of networks, including the Internet, a LAN (local area network), a WAN (wide area network), a SAN (storage area network), and wireless networks (e.g., satellite, cellular, RF, etc.). The multimedia content may be one or more various forms of data, including video, audio, graphical, textual, and the like. For discussion purposes, the content is described as being video data.

The content producer/provider 402 may be implemented in many ways, including as one or more server computers configured to store, process, and distribute video data. The content producer/provider 402 has a video storage 410 to store digital video files 412 and a distribution server 414 to encode the video data and distribute it over the network 404. The server 414 has a processor 416, an operating system 418 (e.g., Windows NT®, Unix, etc.), and a video encoder 420. The video encoder 420 may be implemented in software, firmware, and/or hardware. For example, the video encoder 420 may include computer-executable instructions that are executable by the processor 416 and encoded on computer-readable storage media, such as a compact disc read-only memory (CD-ROM) or hard disk drive. The encoder is shown as a separate standalone module for discussion purposes, but may be constructed as part of the processor 416 or incorporated into operating system 418 or other applications (not shown).

The video encoder 420 encodes the video data 412 using a motion-compensation-based coding scheme. More specifically, the encoder 420 employs a progressive fine-granularity scalable (PFGS) layered coding scheme. The video encoder 420 encodes the video into multiple layers, including a base layer and one or more enhancement layers. "Fine-granularity" coding means that the difference between any two layers, even if small, can be used by the decoder to improve the image quality. Fine-granularity layered video coding makes sure that the prediction of a next video frame from a lower layer of the current video frame is good enough to keep the efficiency of the overall video coding.

The video encoder 420 has a base layer encoding component 422 to encode the video data in the base layer. The base layer encoder 422 produces a base layer bitstream that is protected by conventional error protection techniques, such as FEC (Forward Error Correction) techniques. The base layer encoder 422 is transmitted over the network 404 to the client 406.

The video encoder 420 also has an enhancement layer encoding component 424 to encode the video data in one or more enhancement layers. The enhancement layer encoder 424 creates an enhancement layer bitstream that is sent over the network 404 to the client 406 independently of the base layer bitstream. The enhancement layer encoder 424 inserts unique resynchronization marks and header extension codes into the enhancement bitstream that facilitate syntactic and semantic error detection and protection of the enhancement bitstream.

The video encoder encodes the video data such that some of the enhancement layers in a current frame are predicted from at least one same or lower quality layer in a reference frame, whereby the lower quality layer is not necessarily the base layer. The video encoder 420 may also include a bit-plane coding component 426 that predicts data in higher enhancement layers.

The client 406 is equipped with a processor 430, a memory 432, and one or more media output devices 434. The memory 432 stores an operating system 436 (e.g., a Windows®-brand operating system) that executes on the processor 430. The operating system 436 implements a client-side video decoder 438 to decode the base and enhancement bitstreams into the original video. The client-side video decoder 438 has a base layer decoding component 440 and an enhancement layer decoding component 442, and optionally a bit-plane coding component 444.

Following decoding, the client stores the video in memory and/or plays the video via the media output devices 434. The client 406 may be embodied in many different ways, including a computer, a handheld entertainment device, a set-top box, a television, an Application Specific Integrated Circuits (ASIC), and so forth.

Exemplary PFGS Layered Coding Scheme

As noted above, the video encoder 420 encodes the video data into multiple layers, such that some of the enhancement layers in a current frame are predicted from a layer in a reference frame that is not necessarily the base layer. There are many ways to implement this PFGS layered coding scheme. One example is illustrated in FIG. 5 for discussion purposes and to point out the advantages of the PFGS layered coding scheme.

Figure 5:
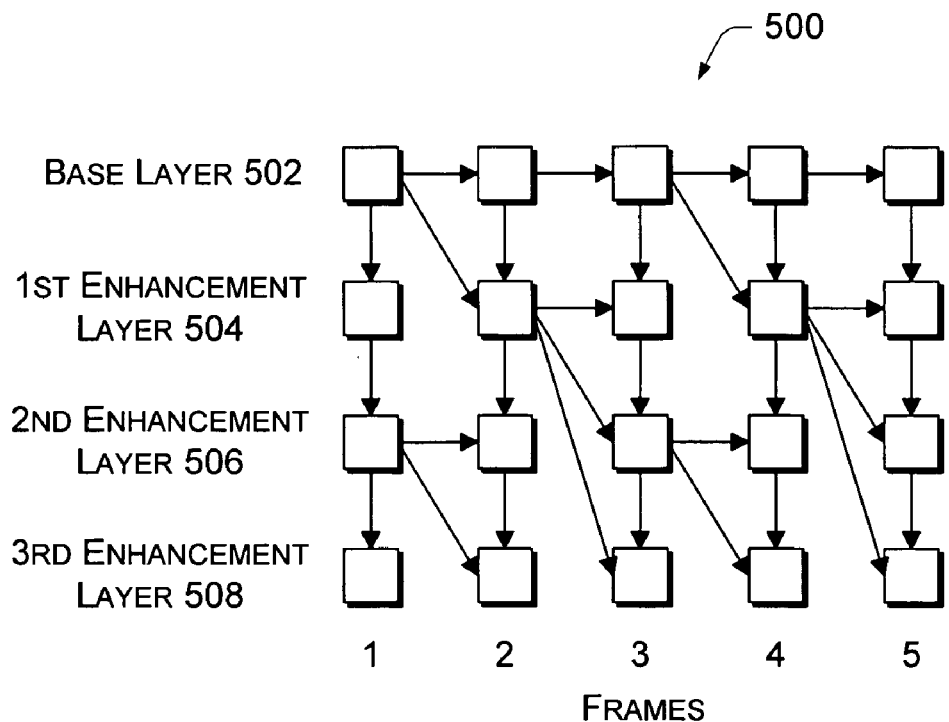
FIG. 5 is diagrammatic illustration of a layered coding scheme used by the content producer/provider to encode the video data.

FIG. 5 conceptually illustrates a PFGS layered coding scheme 500 implemented by the video encoder 420 of FIG. 4. The encoder 420 encodes frames of video data into multiple layers, including a base layer and multiple enhancement layers. For discussion purposes, FIG. 5 illustrates four layers: a base layer 502, a first layer 504, a second layer 506, and a third layer 508. The upper three layers 504-508 are enhancement layers to the base video layer 502. The term layer here refers to a spatial layer or SNR (quality layer) or both. Five consecutive frames are illustrated for discussion purposes.

For every inter frame, the original image is compensated by referencing a previous base layer and one enhancement layer to form the predicted image. Residues resulting from the prediction are defined as the difference between the original image and the predicted image. As an example, one linear transformation used to transform the original image is a Discrete Cosine Transform (DCT). Due to its linearity, the DCT coefficients of predicted residues equal the differences between DCT coefficients of the original image and the DCT coefficients of the predicted image.

The number of layers produced by the PFGS layered coding scheme is not fixed, but instead is based on the number of layers needed to encode the residues. For instance, assume that a maximum residue can be represented in binary format by five bits. In this case, five enhancement layers are used to encode such residues, a first layer to code the most significant bit, a second layer to code the next most significant bit, and so on.

With coding scheme 500, higher quality layers are predicted from at least the same or lower quality layer, but not necessarily the base layer. In the illustrated example, except for the base-layer coding, the prediction of some enhancement layers in a prediction frame (P-frame) is based on a next lower layer of a reconstructed reference frame. Here, the even frames are predicted from the even layers of the preceding frame and the odd frames are predicted from the odd layers of the preceding frame. For instance, even frame 2 is predicted from the even layers of preceding frame 1 (i.e., base layer 502 and second layer 506). The layers of odd frame 3 are predicted from the odd layers of preceding frame 2 (i.e., the first layer 504 and the third layer 506). The layers of even frame 4 are once again predicted from the even layers of preceding frame 3. This alternating pattern continues throughout encoding of the video bitstream. In addition, the correlation between a lower layer and a next higher layer within the same frame can also be exploited to gain more coding efficiency.

The scheme illustrated in FIG. 5 is but one of many different coding schemes. It exemplifies a special case in a class of coding schemes that is generally represented by the following relationship:

$$L \bmod N = i \bmod M$$

where L designates the layer, N denotes a layer group depth, i designates the frame, and M denotes a frame group depth. Layer group depth defines how many layers may refer back to a common reference layer. Frame group depth refers to the number of frames or period that are grouped together for prediction purposes.

The relationship is used conditionally for changing reference layers in the coding scheme. If the equation is true, the layer is coded based on a lower reference layer in the preceding reconstructed frame.

The relationship for the coding scheme in FIG. 5 is a special case when both the layer and frame group depths are two. Thus, the relationship can be modified to L mod N=i mod N, because N=M. In this case where N=M=2, when frame i is 2 and layer L is 1 (i.e., first layer 504), the value L mod N does not equal that of i mod N, so the next lower reference layer (i.e., base layer 502) of the reconstructed reference frame 1 is used. When frame i is 2 and layer L is 2 (i.e., second layer 506), the value L mod N equals that of i mod N, so a higher layer (i.e., second enhancement layer 506) of the reference frame is used.

Generally speaking, for the case where N=M=2, this relationship holds that for even frames 2 and 4, the even layers (i.e., base layer 502 and second layer 506) of preceding frames 1 and 3, respectively, are used as reference; whereas, for odd frames 3 and 5, the odd layers (i.e., first layer 504 and third layer 508) of preceding frames 2 and 4, respectively, are used as reference.

The above coding description is yet a special case of a more general case where in each frame the prediction layer used can be randomly assigned as long as a prediction path from lower layer to higher layer is maintained across several frames. The coding scheme affords high coding efficiency along with good error recovery. The proposed coding scheme is particularly beneficial when applied to video transmission over the Internet and wireless channels. One advantage is that the encoded bitstream can adapt to the available bandwidth of the channel without a drifting problem.

Figure 6:
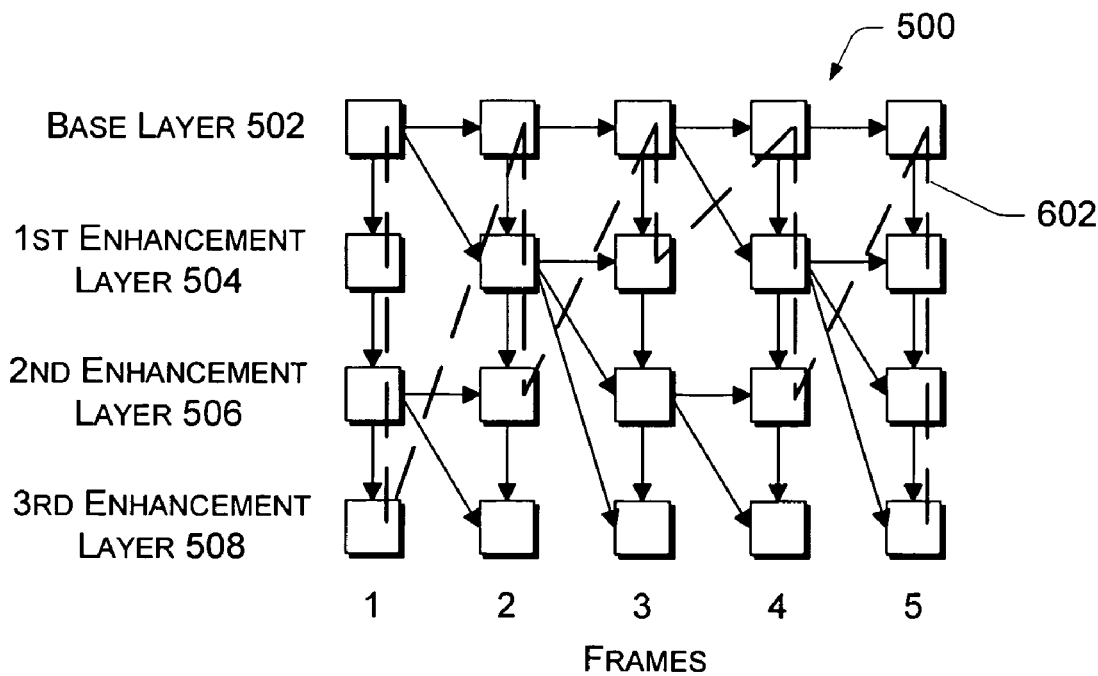
FIG. 6 is similar to FIG. 5 and further shows how the number of layers that are transmitted over a network can be dynamically changed according to bandwidth availability.

FIG. 6 shows an example of this bandwidth adaptation property for the same coding scheme 500 of FIG. 5. A dashed line 602 traces the transmitted video layers. At frames 2 and 3, there is a reduction in bandwidth, thereby limiting the amount of data that can be transmitted. At these two frames, the server simply drops the higher layer bits (i.e., the third layer 508 is dropped from frame 2 and the second and third layers 506 and 508 are dropped from frame 3). However after frame 3, the bandwidth increases again, and the server transmits more layers of video bits. By frame 5, the decoder at the client can once again obtain the highest quality video layer.

Enhancement Layer Protection

The base layer and enhancement layers illustrated in FIG. 5 are encoded into two bitstreams: a base layer bitstream and an enhancement layer bitstream. The base layer bitstream may be encoded in a number of ways, including the encoding described in the above incorporated applications. It is assumed that the base layer bitstream is encoded with appropriate error protection so that the base layer bitstream is assured to be correctly received and decoded at the client.

The enhancement bitstream is encoded with syntactic and semantic error detection and protection. The additional syntactic and semantic components added to the enhancement bitstream are relatively minimal to avoid adding too much overhead and to avoid increasing computational complexity. But, the techniques enable the video decoder to detect and recover when the enhancement bitstream is corrupted by channel errors.

Figure 7:
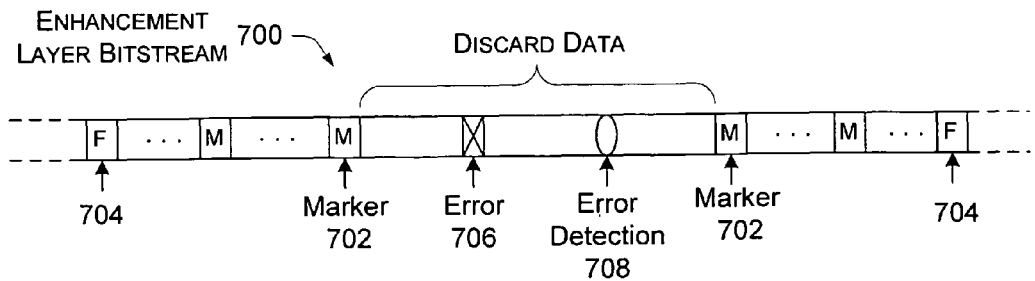
FIG. 7 is a diagrammatic illustration of an enhancement layer bitstream that includes error detection and protection syntax.

FIG. 7 shows a structure 700 of the enhancement layer bitstream encoded by enhancement layer encoder 424. The enhancement layer encoder 424 inserts unique resynchronization markers 702 into the enhancement bitstream at equal macroblock or equal bit intervals while constructing the enhancement bitstream. Generally, the unique resynchronization markers 702 are words that are unique in a valid video bitstream. That is, no valid combination of the video algorithm's VLC (variable length code) tables can produce the resynchronization words. In the described implementation, the resynchronization markers 702 are formed by unique start codes located in video packet headers as well as VOP (Video Of Plane) and BP (Bit Plane) start codes. The resynchronization markers 702 occur many times between the frame markers 704 identifying multiple points to restart the decoding process.

The resynchronization markers 702 may be used to minimize the amount of enhancement data that is lost in the event of a packet loss or error. As the decoder receives the enhancement layer bitstream 700, the decoder attempts to detect any errors in the packets. In one implementation, the error detection mechanism of the enhancement bitstream has many methods to detect bitstream errors:

Whether an invalid VLC table entry is found.
Whether the number of DCT (Discrete Cosine Transform) coefficients in a block exceeds 64.
Whether the layer number of bit plane in BP header is continuity.
Whether the number of macroblock in video packet header is continuity.
Whether the information in the VOP header matches that in HEC part.

Upon detection of an error, the decoder seeks forward in the bitstream 700 for the next unique resynchronization word 702. Once the marker is found, the decoder begins decoding the next video packet.

Due to these relatively weak detection mechanisms within one video packet, it is usually not possible to detect the error at the actual error occurrence location. In FIG. 7, an actual error may occur at one location 706 in the bitstream 700 and its detection may occur at another location 708 in the bitstream 700. Since the error cannot be precisely specified, all data between the two resynchronization markers 702 is discarded.

Figure 1:
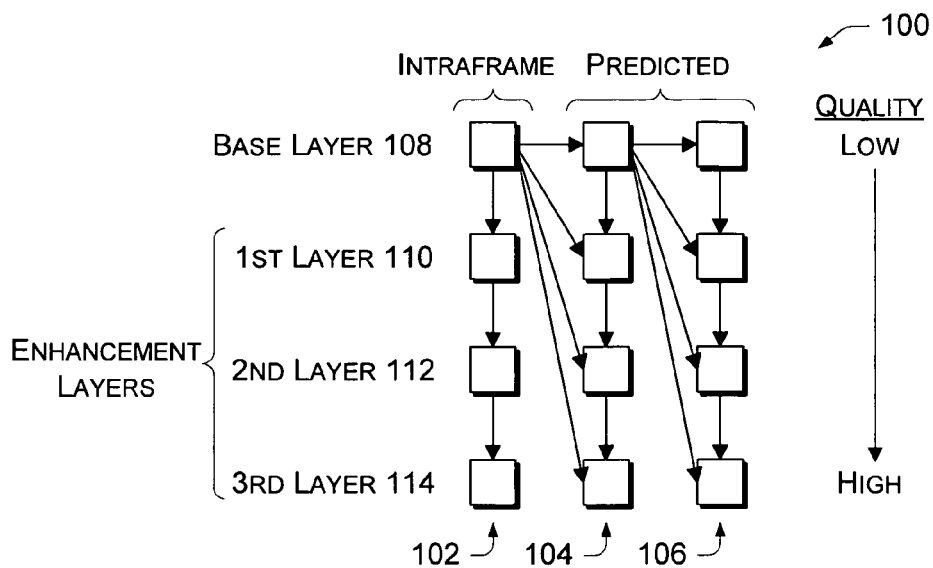
FIG. 1 is a diagrammatic illustration of a prior art layered coding scheme in which all higher quality layers can be predicted from the lowest or base quality layer.
Figure 2:
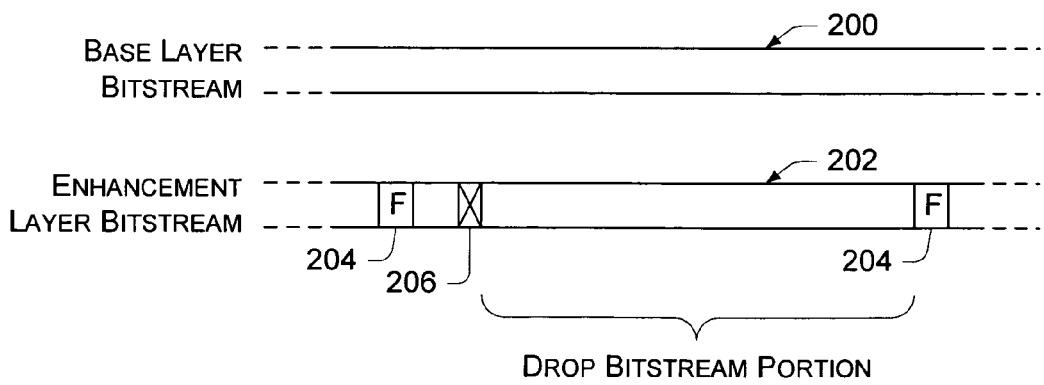
FIG. 2 is a diagrammatic illustration of a base layer bitstream and an enhancement layer bitstream.
Figure 3:
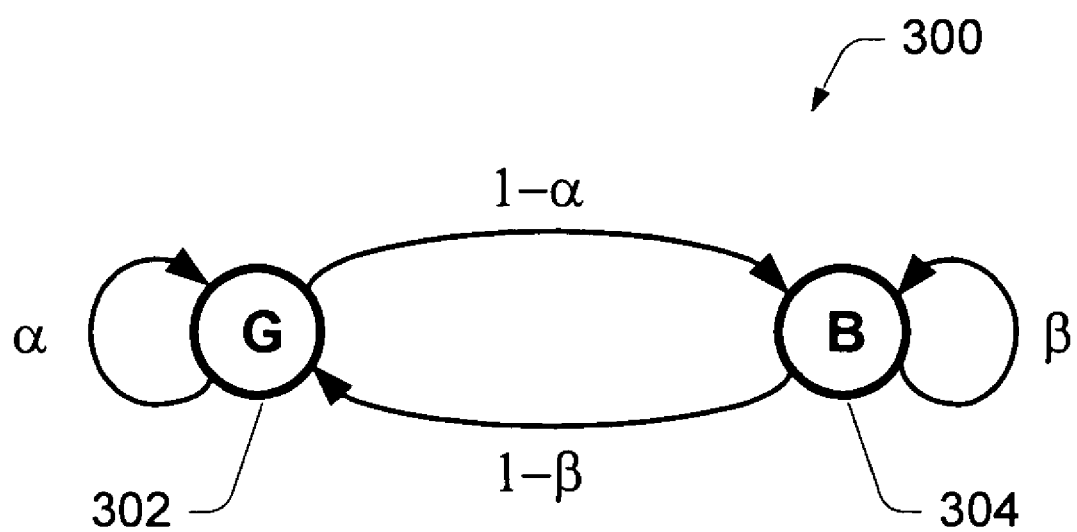
FIG. 3 is a state diagram for a two-state Markov model that simulates packet losses in an Internet channel and symbol errors in a wireless channel.

With the new structure of enhancement layer bitstream 700, only the part of the bitstream containing the error is discarded when the decoder detects an error. This is an improvement over prior enhancement bitstream structures where, when an error was detected, the rest of the enhancement bitstream for the entire frame had to be discarded. Consider the conventional enhancement bitstream in FIG. 2, where only VOP start codes and BP start codes are used as resynchronization markers. With so few markers (usually about 1 to 8 markers in one frame), any one error will render the enhancement bitstream in this frame undecodable. By adding many additional markers (e.g., several dozens per frame), the video packet headers effectively partition the enhancement bitstream into smaller packets. As a result, one error only renders part of the enhancement bitstream undecodable. The decoder can still decode portions of the following enhancement bitstream. Therefore, the effective transmitted data are no longer determined only by channel error conditions. If the channel bandwidth is enough, more bits can be decoded.

Figure 8:
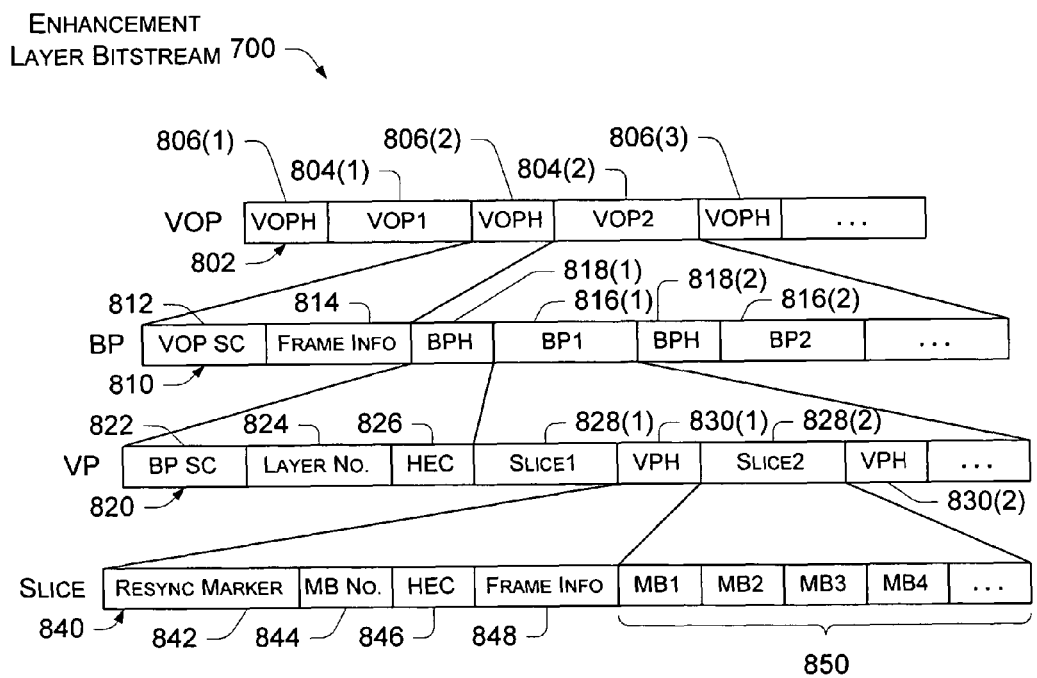
FIG. 8 illustrates a hierarchical structure of the enhancement layer bitstream of FIG. 7.

FIG. 8 shows the enhancement layer bitstream 700 in more detail to illustrate the hierarchical structure. The enhancement layer bitstream 700 includes an upper VOP (Video Of Plane) level 802 having multiple VOP segments 804, labeled as VOP1, VOP2, and so on. An associated VOP header (VOPH) 806 resides at the beginning of every VOP 804.

The content of each pair of VOP 804 and VOPH 806 forms a middle level that constitutes the BP (Bit Plane) level 810 because the bit-plane coding compresses the quantized errors of the base layer to form the enhancement bitstream. Within the bit plane level 810 are fields of the VOP header 806, which includes a VOP start code (SC) 812 and other frame information 814, such as fields including time stamps, VOP type, motion vectors length, and so on. The syntax and semantic of the VOP header 806 are the same as that of the MPEG-4 standard. Any one error in a VOP header 806 may cause the current VOP bitstream 802 to be undecodable.

Each VOP 804 is formed of multiple bit planes 816 and associated BP headers (BPH) 818. In FIG. 6, the bit planes 816 for VOP2 are labeled as BP1, BP2, and so forth. The BP header 818 denotes the beginning of every bit plane, and the header can also be used as a video packet header.

The contents of each pair of bit plane 816 and BP header 818 forms the bottom level of the enhancement bitstream 700, and this bottom level is called the video packet (VP) level 820. Within the VP level 820 are three fields of the BP header 818. These fields include a BP start code 822, the layer number 824 that indicates the current bit plane index, and a Header Extension Code (HEC) field 826. The HEC field 826 is a one-bit symbol that indicates whether data in the VOP header is duplicated in the lower level BP and VP headers so that in the event that the VOP header is corrupted by channel errors or other irregularities, the BP and VP headers may be used to recover the data in the VOP header. The use of the HEC field is described below in more detail.

Following the bit-plane header are multiple video packets that consists of slice data 828 (e.g., SLICE1, SLICE2, etc.) and video packet headers (VPH) 830. One video packet header 830 precedes every slice in the bit plane 810, except for the first slice. Every pair of VP header 830 and slice data 828 forms a video packet. The video packet header 830 contains resynchronization markers that are used for enhancement bitstream error detection.

The content of each pair of slice 828 and VP header 830 forms the slice level 840. The first field in the video packet header 830 is a resynchronization marker 842 formed of a unique symbol. The decoder can detect any errors between two adjacent resynchronization markers 842. Once the errors are detected, the next resynchronization marker in the enhancement bitstream 700 is used as the new starting point. The second field 844 in video packet header is the index of first macroblock in this slice. Following the index field 844 are a HEC field 846 and frame information 848.

The slice data 828 follows the VP header. In the illustrated implementation, the slice data 828 is similar to a GOB in the H.261 and H.263 standard, which consists of one or multiple rows of macroblocks 850 (e.g., MB1, MB2, etc.). This structure is suitable for an enhancement layer bitstream. Any erroneous macroblock in lower enhancement layers causes the macroblock at the same location in higher enhancement layers to be undecodable due to the dependencies of the bit planes. So, if one error is detected in some video packet in a lower enhancement layer, the corresponding video packets in higher enhancement layers can be dropped. On the other hand, the bits used in lower bit plane layers are fewer and the bits used in higher bit plane layers are more. The same number of video packets in each bit plane can provide stronger detection and protection capabilities to the lower enhancement layers because the lower the enhancement layer, the more important it is. Of course, the mean by the given bits can be also employed to determine how much macroblocks should be comprised in the same slice. But this method may increase the computational intensity for error detection.

According to the hierarchical bitstream structure, the resynchronization markers 702 (FIG. 8) are formed by a VOP start code 812, several BP start codes 822 and many VP start codes 842. These start codes are unique symbols that cannot be produced by valid combination of VLC tables. They are separately located at the VOP header and every bit plane header and every video packet header. Besides these start codes in VOP headers and BP headers, since more VP (Video Packet) start codes are added into the enhancement bitstream as resynchronization markers 844, the number of resynchronization markers is greatly increased, thereby minimizing the amount of data that may be dropped in the event of packet loss or channel error.

In the described coding scheme, the VOP header 806 contains important data used by the decoder to decode the video enhancement bitstream. The VOPH data includes information about time stamps associated with the decoding and presentation of the video data, and the mode in which the current video object is encoded (whether Inter or Intra VOP). If some of this information is corrupted due to channel errors or packet loss, the decoder has no other recourse but to discard all the information belonging to the current video frame.

To reduce the sensitivity to the VOP header 806, data in the VOP header may be 806 is duplicated in the BP and VP headers. In the described implementation, the duplicated data is the frame information 814. The HEC fields 826 and 846 indicate whether the data is duplicated in the corresponding BP header or VP header. Notice that HEC field 826 appears in the third field of the BP header 818 and HEC field 846 resides in the third field of the VP header 830. If HEC field in BP header and VP header is set to binary "1", the VOP header data is duplicated in this BP header and VP header. A few HEC fields can be set to "1" without incurring excessive overhead. Once the VOP header is corrupted by channel errors, the decoder is still able to recover the data from the BP header and/or VP header. Additionally, by checking the data in BP header and VP header, the decoder can ascertain if the VOP header was received correctly.

Enhancement Layer Bitstream Packing Scheme

For some applications, the server may wish to pack the enhancement layer bitstream 700 into transport packets for delivery over the Internet or wireless channel. In this context, the decoder must contend with missing or lost packets, in addition to erroneous packets. If a video packet in a lower enhancement layer is corrupted by channel errors, all enhancement layers are undecodable even though the corresponding video packets in higher enhancement layer are correctly transmitted because of the dependencies among bit planes. So the video packets at the same location, but in different bit planes, should be packed into the same transport packet.

Figure 9:
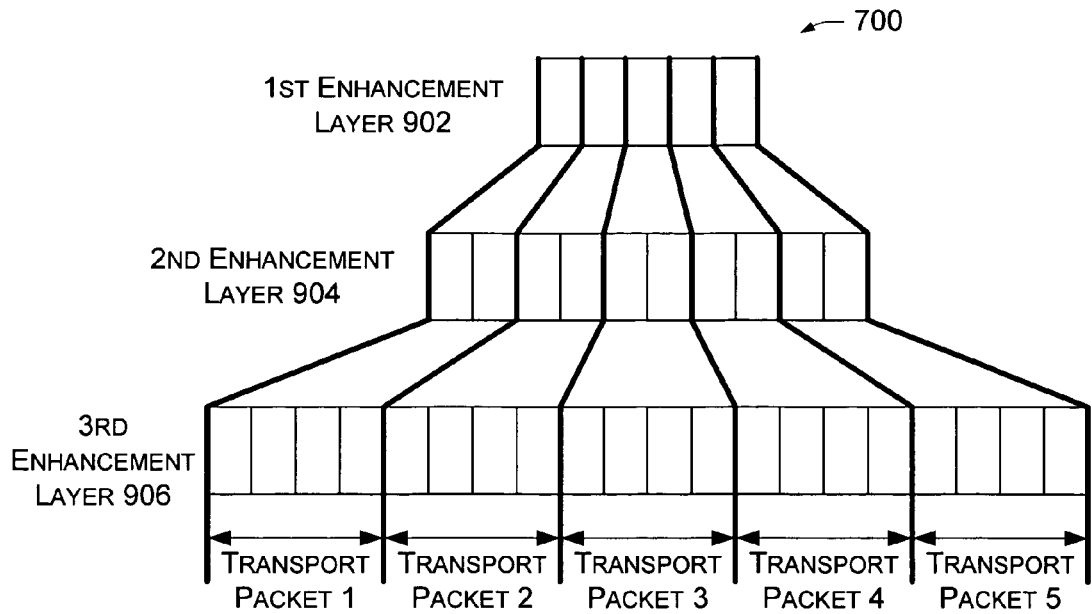
FIG. 9 illustrates a technique for packing transport packets carrying the enhancement layer bitstream.

FIG. 9 shows a packing scheme for the enhancement layer bitstream 700 that accommodates the error characteristics of Internet channels. Here, the bitstream 700 has three enhancement layers—$1^{st}$ enhancement layer 902, $2^{nd}$ enhancement layer 904, and $3^{rd}$ enhancement layer 906—packed into five transport packets. The basic criterion is that the video packets belonging to different enhancement layers at the same location are packed into the same transport packet. Every transport packet can comprise one or multiple video packets in the same enhancement layers subject to the enhancement bitstream length and the transport packet size. These video packets in the same bit plane can be allocated into transport packets according to either neighboring location or interval location.

Figure 10:
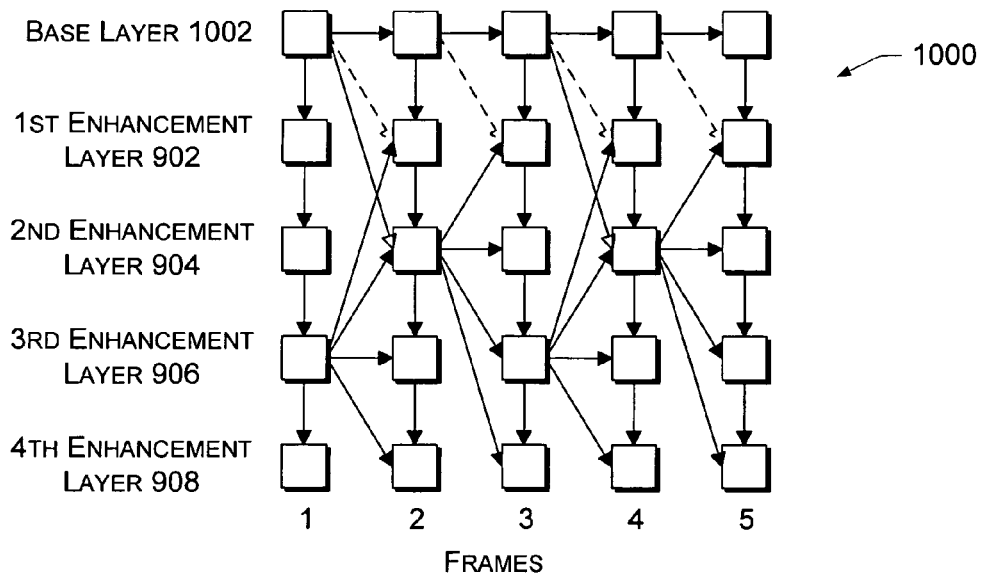
FIG. 10 is diagrammatic illustration of a layered coding scheme that accommodates the packing scheme shown in FIG. 9.

FIG. 10 shows a special case of a PFGS layered coding scheme 1000 implemented by the video encoder 420 that accounts for extra requirements for packing several frames into a packet. The scheme encodes frames of video data into multiple layers, including a base layer 1002 and multiple enhancement layers: the first enhancement layer 902, the second enhancement layer 904, the third layer 906, and a fourth enhancement layer 908. In this illustration, solid arrows represent prediction references, hollow arrows with solid lines represent reconstruction references, and hollow arrows with dashed-lines represent reconstruction of lower layers when the previous enhancement reference layer is not available.

Notice that the enhancement layers in frame 1 have a weak effect to the enhancement layers in frame 2, because the high quality reference in frame 2 is reconstructed from the base layer in frame 1. But the enhancement layers in frame 2 will seriously affect the enhancement layers in frame 3, because the high quality reference in frame 3 is reconstructed from the second enhancement layer 806 in frame 2.

Thus, as part of the packing scheme, the server packs video packets with large frame correlations into a transport packet. For an example, the video packets in frame 2 and frame 3 are packed together, the video packets in frame 4 and frame 5 are packed together, and so on.

Encoding Enhancement Layer Bitstream

Figure 11:
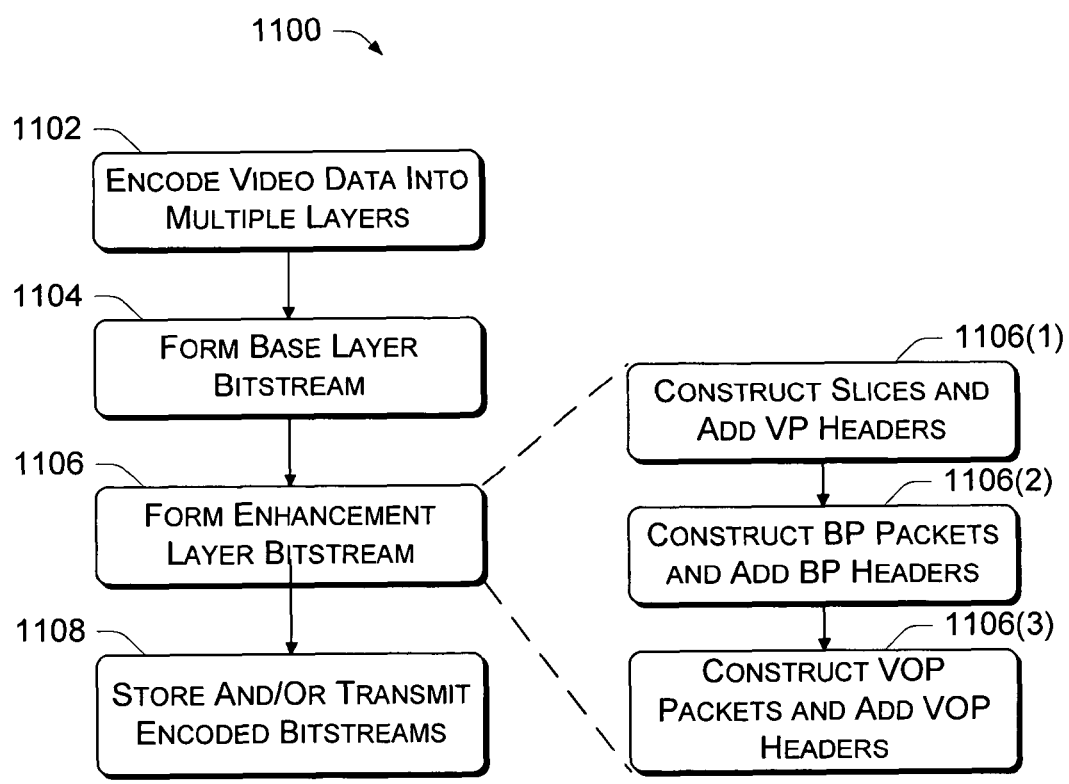
FIG. 11 is a flow diagram showing a method for encoding video data into a base layer bitstream and an enhancement layer bitstream.

FIG. 11 shows a process 1100 for encoding the enhancement layer bitstream according to the structure 700 illustrated in FIG. 8. The process may be performed in hardware, or in software as computer-executable instructions that, when executed, perform the operations illustrated in FIG. 11. The computer-executable instructions may be encoded on computer-readable storage media, such as a compact disc read-only memory (CD-ROM) or hard disk drive.

At block 1102, the encoder 420 encodes source data (e.g., macroblocks) into different layers, including a base layer and multiple enhancement layers. The encoder may use various coding schemes, such as those shown in FIGS. 5 and 10. In one implementation, the encoder encodes each intra-frame (or "I-frame") into different layers then encodes each predicted frame (or "P-frame") into different layers.

At block 1104, the base layer encoder 422 forms a base layer bitstream. This bitstream may be constructed in a number of ways, including using the PFGS coding techniques described in the above incorporated applications. The base layer bitstream is protected by error protection techniques to ensure reliable delivery.

At block 1106, the enhancement layer encoder 424 forms the enhancement layer bitstream. The enhancement bitstream can be separated into multiple subprocesses, as represented by operations 1106(1)-1106(3). At block 1106(1), the encoder 424 groups sets of multiple encoded macroblocks 850 (e.g., one row of macroblocks in a bit plane) to form slices 828 and attaches a video packet header 830 to each slice (except the first slice). Each VP header includes a resynchronization marker 842. One or more VP headers may also include information that is duplicated from an eventual VOP header that will be added shortly. If duplicated information is included, the HEC field 846 in the VP header 830 is set to "1".

At block 1106(2), streams of VP headers 830 and slices 828 are grouped to form bit planes 816. The encoder adds a bit plane header 818 to each BP 816. The BP header 818 includes a start code 820, which functions as a synchronization marker, and some layer information 824. This layer information may be duplicated from the VOP header. If duplicated, the associated HEC field 826 in the BP header 818 is set to "1".

At block 1106(3), groups of BP packets 816 and BP headers 818 are gathered together to form video of plane segments 804. The enhancement layer encoder 424 adds a VOP header 806 to each VOP segment 804. The VOP header includes a start code 812 for each VOP, which also functions as a synchronization marker, and frame information 814. As noted above, this frame information may be copied into the BP header and VP header.

After formation, the encoded base layer and enhancement layer bitstreams can be stored in the compressed format in video storage 410 and/or transmitted from server 414 over the network 404 to the client 406 (step 1108). When transmitted, the server transmits the base layer bitstream within the allotted bandwidth to ensure delivery of the base layer. The server also transmits the enhancement layer bitstream as bandwidth is available.

Decoding Enhancement Layer Bitstream

Figure 12:
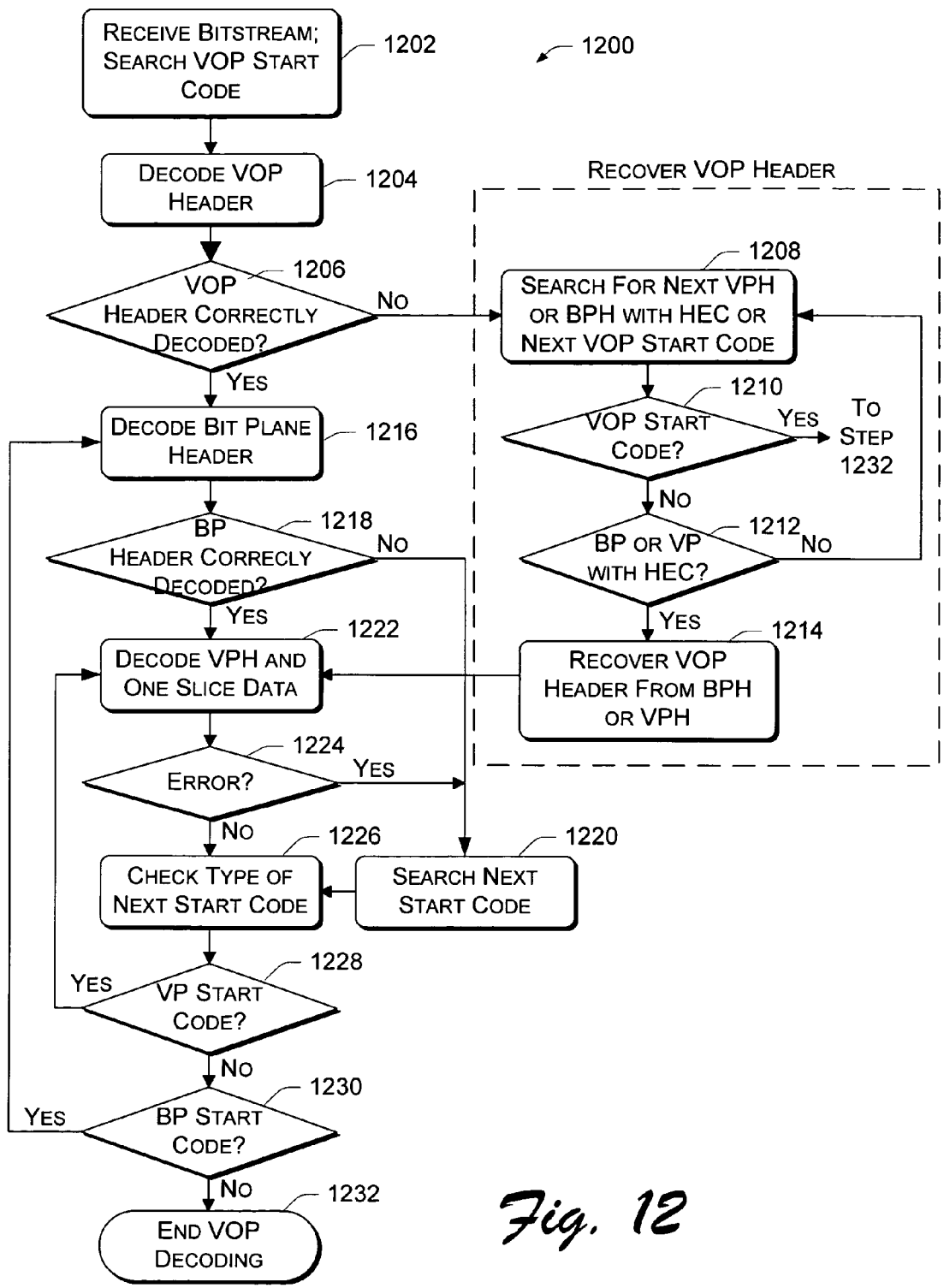
FIG. 12 is a flow diagram showing a method for decoding the enhancement layer bitstream.

FIG. 12 shows a process 1200 for decoding the enhancement bitstream structure 700 after transmission over an Internet or wireless channel. It is assumed that the base layer has been correctly decoded and hence the decoding process 1200 focuses on decoding the enhancement bitstream. The process may be performed in hardware, or in software as computer-executable instructions that, when executed, perform the operations illustrated in FIG. 12. The computer-executable instructions may be encoded on computer-readable storage media, such as a compact disc read-only memory (CD-ROM) or hard disk drive. The process is described with reference to the structure 700 illustrated in FIG. 8.

At block 1202, the client-side decoder 442 receives the enhancement layer bitstream 700 from the network and begins searching for a location of a VOP start code 812 in the enhancement layer bitstream. Once the VOP start code 812 is located, the decoder 442 starts to decode the current VOP header (block 1204) to glean important information, such as time stamps, VOP type, motion vector length, and so on.

The decoder 442 checks whether the VOP header can be correctly decoded (block 1206). If the VOP header cannot be correctly decoded (i.e., the "no" branch from block 1206), a recovery procedure is used to recover data in the current VOP header. In the recovery procedure, the decoder searches forward for the next BP header 618 or VP header 630 having its associated HEC field 626, 640 set to "1", because the information in the missing or corrupted VOP header is also contained in such headers (block 1208). The decoder also searches forward for the next VOP header, in an event that neither a BP header 618 nor a VP header 630 with HEC set to "1" is found.

If the decoder comes to a VOP header first (i.e., the "yes" branch from block 1210), the process ends the decoding of the current VOP header (block 1232). In this case, the decoder effectively discards the data in the enhancement bitstream between the VOP header and the next VOP header. Alternatively, if the decoder finds a BP or VP header with HEC set to "1" (i.e., the "no" branch from block 1210 and the "yes" branch from block 1212), the decoder recovers the information in the VOP header from the BP or VP header to continue with the decoding process (block 1222).

Returning to block 1206, if the VOP header can be correctly decoded, the data in VOP header is used to set the decoder. The decoder then begins decoding the bit plane header (block 1216) to obtain the current index of the bit plane that is used for bit-plane decoding. Also, the decoder can use the decoded BP header to double check whether the VOP header was received correctly. If the HEC field in the BP header is set to "1", the decoder can decode the duplicated data in the BP header and compare that data with the data received in the VOP header.

At block 1218, the process evaluates whether the BP header can be correctly decoded. If the BP header cannot be correctly decoded (i.e., the "no" branch from block 1218), the decoder searches for the next synchronization point, such as the next VOP start code, BP start code, or VP start code (block 1220). All these markers are unique in the enhancement bitstream. Thus, the error process employed by the decoder is simply to search for the next synchronization marker once the decoder detects any error in the BP header.

With reference again to block 1218, if the BP header can be correctly decoded (i.e., the "yes" branch from block 1218), the decoder 442 begins decoding the VP header (VPH) and slice data (block 1222). If the first field in the VP header is the VP start code, the decoder first decodes the VP header. If the HEC field in the VP header is "1", the decoder can decode the duplicated data in the VP header to determine (perhaps a second time) whether the VOP header was received correctly. Then, the decoder decodes one or multiple rows of macroblocks in the current bit plane.

If the decoder detects an error in decoding the slice data (i.e., the "yes" branch from block 1224), the decoder searches for the next synchronization point at operation 1220. By embedding many synchronization points in the enhancement layer bitstream and allowing the decoder to search to the next synchronization point, the bitstream structure and decoding process minimizes the amount of enhancement data that is discarded. Only the data from the current data slice is lost. If no error is detected in the slice data (i.e., the "no" branch from block 1224), the decoder determines the type of the next synchronization marker, evaluating whether the synchronization marker is a VP start code, a BP start code, or a VOP start code (block 1226). If the next synchronization marker is a VP start code (i.e., the "yes" branch from block 1228), the decoder decodes the next VP header and data slice (block 1222). If the next synchronization marker is a BP start code (i.e., the "no" branch from block 1228 and the "yes" branch from block 1230), the decoder begins decoding the BP header (block 1216). If the next synchronization marker is the VOP start code (i.e., the "no" branch from block 1228 and the "no" branch from block 1230), the decoder ends the decoding of the current VOP (block 1232). The process 1200 is then repeated for subsequent VOPs until all VOPs are decoded.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
detecting an error in an enhancement layer bitstream of video data at a client device executing a base layer decoding component and an enhancement layer decoding component, wherein the enhancement layer bitstream is one of a plurality of enhancement layer bitstreams of the video data and each enhancement layer bitstream includes a plurality of resynchronization markers, wherein the error is located between a first resynchronization marker of a frame of the video data and a second resynchronization marker of the frame of the video data, and wherein the first resynchronization marker and the second resynchronization marker are included in the enhancement layer bitstream; and
discarding data between the first resynchronization marker and the second resynchronization marker at the client device.

2. The method of claim 1, wherein the first resynchronization marker and the second resynchronization marker are located between a first frame marker indicating a beginning of the frame and a second frame marker indicating an end of the frame.

3. The method of claim 1, wherein the enhancement layer bitstream includes an additional resynchronization marker included in the frame of video data, the additional resynchronization marker preceding the first resynchronization marker, and a third resynchronization marker included in the frame of video data, the third resynchronization marker succeeding the second resynchronization marker.

4. A video coding system for coding video data according to layered coding techniques in which the video data is represented as multi-layered frames, each frame having multiple layers ranging from a base layer of low quality to enhancement layers of increasingly higher quality, the video coding system comprising:
a processor;
means for encoding a first bitstream representing a base layer; and
means for encoding a second bitstream representing one or more enhancement layers to include error detection and protection data.

5. The video coding system as recited in claim 4, wherein the error detection and protection data comprises unique synchronization markers inserted throughout the second bitstream.

6. The video coding system as recited in claim 4, wherein the error detection and protection data comprises video-of-plane start codes, bit plane start codes, and video packet start codes.

7. An apparatus comprising:
a processor; and
a video decoder to:
detect an error in an enhancement layer bitstream of video data, wherein the enhancement layer bitstream is one of a plurality of enhancement layer bitstreams of the video data and each enhancement layer bitstream includes a plurality of resynchronization markers, wherein the error is located between a first resynchronization marker of a frame of the video data and a second resynchronization marker of the frame of the video data, and wherein the first resynchronization marker and the second resynchronization marker are included in the enhancement layer bitstream; and
discard data between the first resynchronization marker and the second resynchronization marker.

8. The apparatus of claim 7, wherein the video decoder advances in the enhancement layer bitstream to the second resynchronization marker in response to detecting the error in the enhancement layer bitstream and decodes the enhancement layer bitstream beginning at the second resynchronization marker.

9. A video coding system, comprising:
a processor;
means for coding video data according to layered coding techniques in which the video data is represented as multi-layered frames, each frame having multiple layers ranging from a base layer of low quality to enhancement layers of increasingly higher quality; and
means for forming an enhancement layer bitstream from the enhancement layers that includes multiple resynchronization markers for each frame.

10. The video coding system as recited in claim 9, further comprising:
means for decoding the enhancement layer bitstream;
means for detecting an error in the enhancement layer bitstream;
means for advancing in the enhancement layer bitstream to a next resynchronization marker; and
means for decoding the enhancement layer bitstream beginning at the next resynchronization marker.

11. A computer-readable storage media comprising computer-executable instructions that, when executed by a processor, perform a method comprising:
identifying a header extension code of an enhancement layer bitstream; and
determining whether information of a video of plane header of the enhancement layer bitstream is duplicated in a bit plane header of the enhancement layer bitstream, a video packet header of the enhancement layer bitstream, or a combination thereof, based on a value of the header extension code.

12. The computer-readable storage media as recited in claim 11, wherein the method further comprises determining whether the video of plane header can be correctly decoded.

13. The computer-readable storage media as recited in claim 12, wherein the method further comprises searching for a next bit plane header of the enhancement layer bitstream when the video of plane header cannot be correctly decoded.

14. The computer-readable storage media as recited in claim 12, wherein the method further comprises searching for a next video packet header of the enhancement layer bitstream when the video of plane header cannot be correctly decoded.

15. The computer-readable storage media as recited in claim 12, wherein the method further comprises:
identifying a next video of plane header of the enhancement layer bitstream before identifying a next bit plane header or a next video packet header when the video of plane header cannot be correctly decoded; and
discarding data of the enhancement layer bitstream between the video of plane header and the next video of plane header.

16. The computer-readable storage media as recited in claim 13, wherein the method further comprises recovering information of the video of plane header from the next bit plane header when the header extension code of the next bit plane header is a particular value.

17. The computer-readable storage media as recited in claim 14, wherein the method further comprises recovering information of the video of plane header from the next video packet header when the header extension code of the next video packet header is a particular value.

18. A video coding system, comprising:
a processor;
means for coding video data according to layered coding techniques in which the video data is represented as multi-layered frames, each frame having multiple layers ranging from a base layer of low quality to enhancement layers of increasingly higher quality;
means for forming a slice of video data coded from the enhancement layers;
means for attaching a video packet header to the slice, the video packet header containing a first resynchronization marker;
means for constructing a bit plane containing multiple slices of video data and multiple video packet headers;
means for attaching a bit plane header to the bit plane, the bit plane header containing a second resynchronization marker;
means for constructing a video-of-plane containing multiple bit planes and multiple bit plane headers;
means for attaching a video of plane header to the video-of-plane, the video-of-plane header containing a third resynchronization marker; and
means for forming an enhancement layer bitstream from multiple video-of-planes and multiple video-of-plane headers.

19. The video coding system as recited in claim 18, further comprising means for duplicating information from the video-of-plane header in at least one of the bit plane header and the video packet header.

20. The video coding system as recited in claim 19, wherein the video packet header further contains a header extension code to specify whether the video packet header includes the information duplicated from the video-of-plane header.

21. The video coding system as recited in claim 19, wherein the bit plane header further contains a header extension code to specify whether the bit plane header includes the information duplicated from the video-of-plane header.

22. The video coding system as recited in claim 18, further comprising means for packing the enhancement layer bitstream into multiple transport packets such that the video packets belonging to different enhancement layers, but at a same relative location within the layers, are packed into common transport packets.

23. The video coding system as recited in claim 18, further comprising means for packing the enhancement layer bitstream into multiple transport packets such that video packets with large frame correlations are packed into common transport packets.

24. The video coding system as recited in claim 18, further comprising:

means for decoding the enhancement layer bitstream;

means for detecting an error in the enhancement layer bitstream;

means for advancing in the enhancement layer bitstream to a next resynchronization marker; and means for decoding the enhancement layer bitstream beginning at the next resynchronization marker.

* * * * *